No. 818,340. PATENTED APR. 17, 1906.
D. E. BARTON.
HUB.
APPLICATION FILED NOV. 10, 1904.
2 SHEETS—SHEET 1.
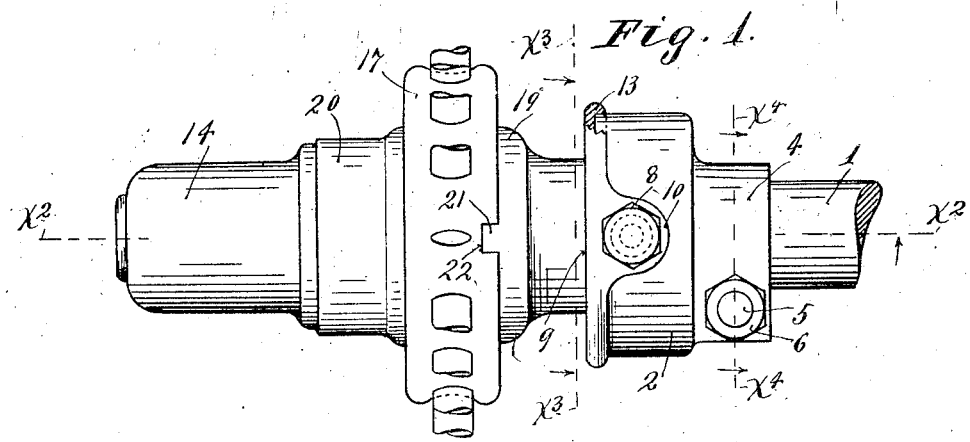
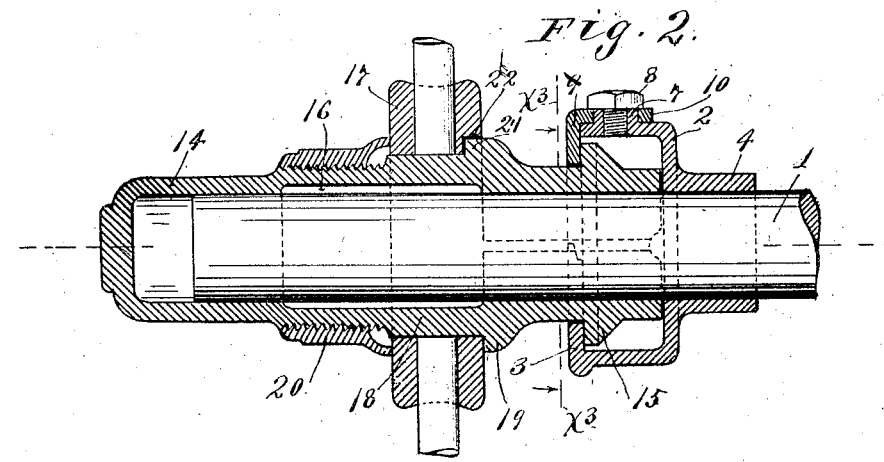
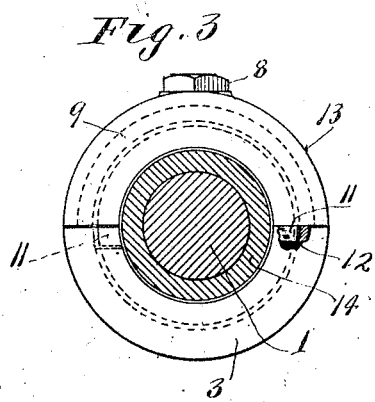
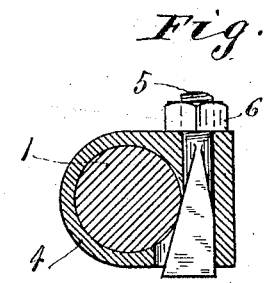
Witnesses
A. H. Opsahl
H. D. Kilgore
Inventor.
Delbert E. Barton
By his Attorneys
Williamson & Merchant No. 818,340. PATENTED APR. 17, 1906.
D. E. BARTON.
HUB.
APPLICATION FILED NOV. 10, 1904.

2 SHEETS—SHEET 2.

Witnesses.
A. H. Opsahl.
H. D. Kilgore.

Inventor.
Delbert E. Barton
By his Attorneys
Williamson Merchant

UNITED STATES PATENT OFFICE.

DELBERT E. BARTON, OF RACINE, WISCONSIN.

HUB.

No. 818,340.  Specification of Letters Patent.  Patented April 17, 1906.

Application filed November 10, 1904. Serial No. 232,126.

*To all whom it may concern:*

Be it known that I, DELBERT E. BARTON, a citizen of the United States, residing at Racine, in the county of Racine and State of Wisconsin, have invented certain new and useful Improvements in Hubs and Axles; and I do hereby declare the following to be a full, clear, and exact description of the invention, such as will enable others skilled in the art to which it appertains to make and use the same.

My invention relates to axles and axle-boxes, and especially to such as are adapted for use on wheeled plows, cultivators, and other agricultural machines, and has for its object to improve the same in the several particulars hereinafter noted.

The invention consists of the novel devices and combinations of devices hereinafter described, and defined in the claims.

In the accompanying drawings, which illustrate my invention, like characters indicate like parts throughout the several views.

Figure 5:
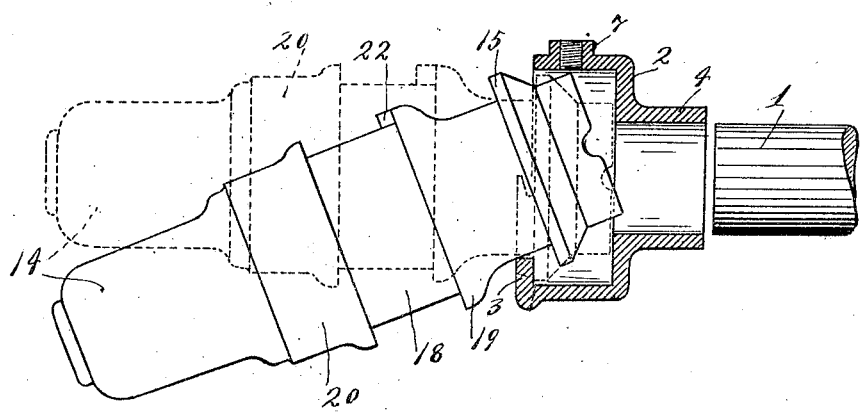
Figure 6:
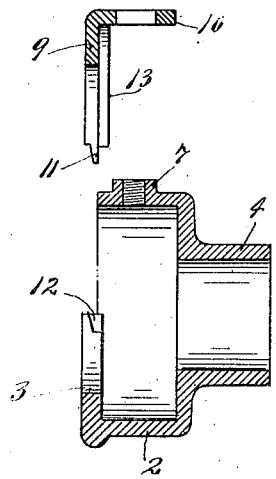

Figure 1 is a plan view with some parts broken away, showing a wheel-hub, axle, and axle-box designed in accordance with my invention. Fig. 2 is a longitudinal vertical section taken on the line $x^2\ x^2$ of Fig. 1. Fig. 3 is a transverse vertical section taken on the line $x^3\ x^3$ of Figs. 1 and 2. Fig. 4 is a transverse vertical section taken on the line $x^4\ x^4$ of Fig. 1. Fig. 5 is a view, partly in side elevation and partly in section, showing the axle, the axle-box, and lock-box, said parts being separated; and Fig. 6 is a vertical section, taken longitudinally and centrally through the lock-box, showing its supplemental retaining flange or segment removed therefrom.

The numeral 1 indicates one end of an axle, to which is rigidly, but preferably adjustably, secured a lock-box 2, the cylindrical portion of which extends concentric with the axle and is provided with an integral segmental retaining-flange 3, which extends through its lower half-circumference. Said cup 2 is provided with an extended hub 4, which fits the axle 1 and is equipped with a wedge-shaped drift-bolt 5, subject to a nut 6, by means of which the box is rigidly secured to the axle in any desired adjustment thereon. This meets a condition necessary or desirable in agricultural machines for adjusting the wheels lengthwise of the axle to secure the suitable spread for adapting the machine to the cultivation of plants in rows which vary in width of spacing crosswise of the line of travel.

At its upper portion the box 2 is shown as provided with a raised boss 7, tapped to receive a set-screw 8, by means of which a half-circle dust-guard 9 may be applied to the box 2 for coöperation with the flange 3 to exclude the dust and dirt from the box when the parts are in working position. The dust-guard 9 has a lateral lug 10, perforated to fit over the boss 7 on the box 2, and when the set-screw 8 is applied the dust-guard will be secured to the box, as best shown in Figs. 1 and 2. The dust-guard 9 supplements the flange 3 of the box 2 and, as shown, is provided with lug-like tips 11, which fit in seats 12, cut on the upper ends of the flange 3 to assist in holding the guard 9 in working position. This, however, is immaterial, as the guard 9 will be held in position by the set-screws 8, as hitherto noted. The half-circle dust-guard 9, as shown, is provided with a lateral flange or bead 13, which overlaps or telescopes with the edge of the box 2 for making a more perfectly dust-tight joint therewith.

The axle-box 14 is closed at its outer end and open at its inner end and is provided near its inner end with a raised bead or flange 15, having one straight and one beveled face for purposes which will presently appear. The end portions of the axle-box 14 are bored to fit the axle 1; but the intermediate portion of the axle-box is counterbored to afford an enlarged chamber 16. The iron wheel-hub 17 fits over an enlarged section 18 of the axle-box 14 and abuts against a raised stop-flange or shoulder 19, formed on the box 14. A lock-nut 20 has screw-threaded engagement with a portion of the axle-box 14 outward of the section 18, to which the wheel-hub is fitted, and by means of the lock-nut 20 the wheel-hub is jammed against the stop-flange 19, and thereby securely locked to the axle-box 14. The stop-flange or shoulder 19 is provided with a lock-lug 21, which engages with the notch 22, provided in the wheel-hub 17 when the parts are in working position, thereby preventing any possibility of the wheel rotatively slipping in respect to the axle-box.

To separate the axle-box 14 from the lock-box 2 or to interlock the said parts together, it is necessary that both thereof be removed from the axle 1, or, otherwise stated, when the said parts are in working position, as shown in Figs. 1 and 2, the axle holds the lock-box and the axle-box in their interlocked position. If the axle-box 14 and the lock-box 2 have been removed from the axle and the half-circle dust-guard 9 has been removed from the lock-box, then the axle-box may be applied to the lock-box by bringing the two parts into an angular relation in respect to each other, so that the bead 15 on the axle-box can enter the chamber of the lock-box, as shown in full lines in Fig. 5, and by then bringing the said two parts into coincidental axial lines they will become interlocked with the bead 15, engaging behind the retaining-flange 3 of the lock-box, as shown by the dotted lines in Fig. 5. Then when the axle is applied the two parts will be interlocked with each other whether the half-circle dust-guard 9 be applied or not. If the half-circle dust-guard 9 be applied when the axle-box and lock-box are detached from the axle but interlocked with each other, then the axle-box and the lock-box will be held interlocked whether applied to the axle or not. After the axle-box and the lock-box have been applied to the axle and rigidly secured thereto by the drift-bolt 5 the half-circle dust-guard 9 is then placed in position and secured by the set-screw 8.

From the foregoing it will be seen that the box 2 serves to lock the axle-box to the axle in any desired adjustment, while permitting the said two parts to be readily separated from each other when removed from the axle. The outward end thrust of the axle-box 14 is taken solely by the retaining or lock flange 3 of the lock-box 2. By reference to Fig. 2 it will be seen that the bead 15 of the axle-box bears against the retaining-flange 3 of the lock-box 2. The bevel on the inner face of the raised bead 15 of the axle-box permits the axle-box and the lock-box 2 to be put together or separated with use of a smaller opening in the face of the box and also affords a larger amount of clearance.

What I claim, and desire to secure by Letters Patent of the United States, is as follows:

1. The combination with an axle and a lock-box rigid thereon and removable therefrom only by axial sliding movements with respect thereto, and an axle-box rotatable on said axle, said two boxes having interlocking beads or flanges which may be interlocked and disengaged only by an endwise rocking movement at an angle to their alined axes, whereby the said two boxes are held interlocked by said axle when in working positions thereon and may be separated when removed therefrom, substantially as described.

2. The combination with an axle, of a lock-box thereon provided with an approximately segmental retaining-flange, and an axle-box rotatable on said axle and provided with a raised bead coöperating with said retaining-flange of said lock-box to hold the said two boxes interlocked when in working position on said axle, and permitting the said boxes to be separated only when removed from said axle and which lock-box and axle-box may be separated only when moved from the axle and given endwise rocking movement the one with respect to the other and free for angular movements with respect to each other, substantially as described.

3. The combination with an axle of an integrally-formed lock-box extending concentric to said axle and provided at its outer side with a segmental retaining-flange extending throughout approximately its lower half-circumference, and an axle-box having at its inner end a raised retaining-bead insertible into said lock-box and removable therefrom only by an endwise rocking movement of one of said boxes with respect to the other, whereby said two boxes are interlocked when in working position on said axle, substantially as described.

In testimony whereof I affix my signature in presence of two witnesses.

DELBERT E. BARTON.

Witnesses:
W. S. MOREY,
ALBERT E. EMMETT.